United States Patent Office 3,579,347
Patented May 18, 1971

3,579,347
SILVER HALIDE EMULSION CONTAINING
WATER-SOLUBLE POLYMER
Henry Walter Wood, Ilford, England, assignor to Ilford
Limited, Ilford, Essex, England
No Drawing. Filed June 10, 1969, Ser. No. 832,021
Claims priority, application Great Britain, June 14, 1968,
28,394/68
Int. Cl. G03c 1/28, 1/72
U.S. Cl. 96—114        6 Claims

ABSTRACT OF THE DISCLOSURE

This application describes photographic material which comprises a gelatino silver halide emulsion layer the photographic material being characterised in that there is present in the said emulsion layer or in a layer in operative contact with the said emulsion layer a water-soluble homopolymer of a compound of the general formula:

$$(CH_2=CH-CH_2)_2NR_1R_2^+X^-$$

where $R_1$ and $R_2$ are each hydrogen atoms or alkyl groups and X is an anion, or a water-soluble copolymer thereof with minor amounts of other ethylenically unsaturated monomers.

---

This invention relates to photographic material and in particular to such material which comprises a layer of gelatino silver halide emulsion having improved light sensitivity.

According to the present invention there is provided photographic material which comprises a gelatino silver halide emulsion layer there being present in the said emulsion layer or in a layer in operative contact with the said emulsion layer a water-soluble homopolymer of a compound of the general Formula I:

$$(CH_2=CH-CH_2)_2NR_1R_2^+X^- \qquad I$$

where $R_1$ and $R_2$ are each hydrogen atoms or alkyl groups and X is an anion, or a water-soluble copolymer thereof with minor amounts of other ethylenically unsaturated monomers.

By minor amounts of other ethylenically unsaturated monomers is meant at the most 5% of other monomers.

It is thought that the above homopolyers have the general Formual II:

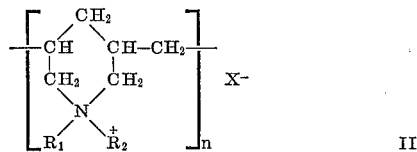

II where $R_1$, $R_2$ and X have the meanings assigned to them above and n is an integral number.

Homopolymers of the above type have been described by Butler and Angelo, J. Amer. Chem. Soc. 1957, 79, 3128.

Copolymers which comprise units of the above Formula II have been described by Schuller et al., Journal of Chemical Engineering Data, 1959, 4, 273. The copolymers may be of different types, for example the copolymer may be a copolymer which comprises a chain of units of general Formula II, there being randomly dispersed in the chain units derived from other ethylenically unsaturated monomers such as vinyl pyrrolidone. Alternatively the copolymer may be a cross-linked copolymer which comprises cross-linked chains of units of general Formula II there being randomly dispersed in the chain units derived from compounds of general Formula I but wherein at least one of $R_1$ or $R_2$ is an allyl group. The presence of these allyl groups causes cross-linking between the chains. In another type of copolymer the homopolymer chains or the random copolymer chains, i.e. chains which comprise randomly dispersed therein units derived from monomers such as vinyl pyrrolidone, may be cross-linked by compounds having two double bonds such as methylenebisacrylamide.

The effect of cross-linking the homopolymer or the random copolymer is to increase the effective molecular weight of the polymeric material and to decrease its water solubility. Thus only a small amount of cross-linking can take place before the copolymer becomes water-insoluble. On the other hand in some instances it is desirable that some cross-linking has taken place because this renders the polymeric material less likely to diffuse from the gelatin.

In the preferred compounds of Formula I for use in the invention $R_1$ and $R_2$ are each alkyl groups.

The preferred amount of homopolymer or copolymer present in the emulsion is from 0.1 to 10 grams per gram mole of silver halide present in the emulsion.

The gelatino silver halide emulsion of the photographic material is preferably sensitised with sulphur sensitisers and with gold sensitisers and in the examples which follow the emulsions which contain no polymeric compound additions have been so sensitised. Also it is preferred that normal photographic emulsion stabilisers such as azaindolizines are present in the emulsion.

The following examples will serve to illustrate the invention:

EXAMPLE 1

A silver iodobromide emulsion was prepared and divided into a number of portions after digestion. To the separate portions were added the amounts given in the accompanying Table I of compounds A, B, C and D.

A: a homopolymer derived from the compound of Formula I wherein $R_1$ and $R_2$ are both ethyl and X is a bromide anion.
B: a cross-linked copolymer formed by copolymerising the monomer of A with 0.2% by weight of methylenebisacrylamide.
C: a copolymer formed by copolymerising the compound used in A with 1% by weight of vinyl pyrrolidone.
D: a homopolymer derived from the compound of Formula I wherein $R_1$ and $R_2$ are hydrogen atoms and X is a chloride anion.
E: a homopolymer derived from the compound of Formula I wherein $R_1$ and $R_2$ are each methyl and X is a chloride anion.
F: a copolymer formed by copolymerising the monomer of E with 1% by weight of acrylamide.

The separate portions of emulsions were all digested to optimum speed in the presence of sodium thiosulphate and a gold salt. An azaindolizine stabiliser was then added and the digestion completed by heating. The separate emulsions were then coated onto cellulose acetate base film strips.

The film strips were exposed to visible light and developed for four minutes in a 1-phenyl-3-pyrazolidone based developer.

The following results were obtained.

TABLE I

| Compound | Amount in g. per mole Ag halide | Characteristics | | |
|---|---|---|---|---|
| | | Fog | S 0.1 | S 2.0 |
| | | 0.02 | 4.29 | 3.47 |
| A | 1.5 | 0.05 | 4.36 | 3.56 |
| | 3.0 | 0.08 | 4.53 | 3.63 |
| | 6.0 | 0.10 | 4.50 | 3.57 |
| B | 1.5 | 0.08 | 4.40 | 3.58 |
| | 3.0 | 0.08 | 4.55 | 3.61 |
| | 6.0 | 0.08 | 4.50 | 3.58 |
| C | 1.5 | 0.11 | 4.42 | 3.60 |
| | 3.0 | 0.11 | 4.45 | 3.62 |
| | 6.0 | 0.11 | 4.48 | 3.62 |
| D | 1.5 | 0.09 | 4.40 | 3.58 |
| | 3.0 | 0.15 | 4.53 | 3.61 |
| | 6.0 | 0.15 | 4.48 | 3.60 |
| E | 0.15 | 0.04 | 4.29 | 3.55 |
| | 0.4 | 0.17 | 4.34 | 3.69 |
| | 0.8 | 0.28 | 4.35 | 3.70 |
| F | 0.15 | 0.05 | 4.29 | 3.54 |
| | 0.4 | 0.25 | 4.29 | 3.65 |
| | 0.8 | 0.28 | 4.33 | 3.66 |

EXAMPLE 2

A silver iodobromide emulsion was digested to optimum speed with sodium thiosulphate and a gold salt. An azaindolizine stabiliser was then added and the digestion completed by heating. The emulsion was then coated onto cellulose acetate film base and the resultant photographic material was divided into a number of discrete sheets.

All the sheets were supercoated with a 2% gelatin solution, some of the sheets contained no addition to this supercoat layer but the remaining sheets contained the amounts of the additives A and B of Example 1 set forth in the Table II which follows.

All the thus coated sheets were exposed to visible light and then developed for 4 minutes in a 1-phenyl-3-pyrazolidinone based developer.

The following results were obtained.

TABLE II

| Compound in supercoat type | Percent | Fog | S 0.1 | S 2.0 |
|---|---|---|---|---|
| 0 | | 0.04 | 4.26 | 3.45 |
| A | 0.1 | 0.04 | 4.37 | 3.60 |
| | 0.2 | 0.13 | 4.45 | 3.68 |
| | 0.4 | 0.16 | 4.50 | 3.58 |
| | 0.8 | 0.07 | 4.47 | 3.53 |
| 0 | | 0.03 | 4.26 | 3.46 |
| B | 0.1 | 0.05 | 4.39 | 3.63 |
| | 0.2 | 0.12 | 4.41 | 3.67 |
| | 0.4 | 0.11 | 4.45 | 3.61 |
| | 0.8 | 0.10 | 4.45 | 3.55 |

The results listed in the above two tables show that when homopolymers or copolymers which are derived from compounds of general Formula I are added to a photographic emulsion or to a supercoat on a photographic emulsion the light sensitivity or in other words the photographic speed of the emulsion is increased.

I claim as my invention:

1. Photographic material which comprises a gelatino silver halide emulsion layer the photographic material being characterised in that there is present in the said emulsion layer or in a layer in operative contact with the said emulsion layer a water-soluble homopolymer of a compound of the general formula:

$$(CH_2=CH-CH_2)_2NR_1R_2{}^+X^-$$

where $R_1$ and $R_2$ are each hydrogen atoms or alkyl groups and X is an anion, or a water-soluble copolymer thereof with minor amounts of other ethylenically unsaturated monomers.

2. Photographic material according to claim 1 wherein in the formula of the compound defined therein $R_1$ and $R_2$ are each alkyl groups.

3. Photographic material according to claim 1 which comprises a water-soluble copolymer of the compound defined in claim 1 with vinyl pyrrolidone.

4. Photographic material according to claim 1 which comprises a water-soluble copolymer of the compound defined in claim 1 with methylenebisacrylamide.

5. Photographic material according to claim 1 wherein the amount of homopolymer or copolymer present in the emulsion is from 0.1 to 10 grams per gram mole of silver halide present in the emulsion.

6. Photographic material according to claim 1 wherein the gelatino silver halide emulsion is sensitized with sulphur sensitisers and with gold sensitisers.

References Cited

UNITED STATES PATENTS 3,288,612   11/1966   Hayakawa et al. _____96—114

NORMAN G. TORCHIN, Primary Examiner

E. G. KIMLIN, Assistant Examiner

U.S. Cl. X.R.

96—107